United States Patent [19]

Gallo

[11] Patent Number: 5,121,100
[45] Date of Patent: Jun. 9, 1992

[54] BRAKE LIGHT

[76] Inventor: Joseph S. Gallo, #8 - 2250 Whitley Court, North Vancouver, British Columbia, Canada, V7J 2R5

[21] Appl. No.: 431,036

[22] Filed: Nov. 3, 1989

[51] Int. Cl.$^5$ .................... B60Q 1/50; G08B 21/00
[52] U.S. Cl. .................... 340/467; 340/466; 340/479; 340/463; 340/669; 340/671; 200/61.45 R; 200/61.12
[58] Field of Search ............ 340/467, 466, 479, 463, 340/464, 441, 669-671, 672; 200/61.45 R, 61.45 M, 52 A, 61.52, 61.12; 11/11

[56] References Cited

U.S. PATENT DOCUMENTS

| 3,332,060 | 7/1967 | Liljequist | 340/467 |
| 3,519,987 | 7/1970 | Jania | 340/467 |
| 3,601,564 | 8/1971 | Ellison | 340/467 |
| 3,927,286 | 12/1975 | Fohl | 200/61.45 R |
| 4,107,647 | 8/1978 | Yoshino | 340/467 |
| 4,357,544 | 11/1982 | Ehrlich et al. | 340/467 |
| 4,751,618 | 6/1988 | Iacovelli | 200/61.52 |
| 4,800,377 | 1/1989 | Slade | 340/467 |
| 4,841,276 | 6/1989 | Abel et al. | 340/467 |

FOREIGN PATENT DOCUMENTS 2327930 6/1977 France .

Primary Examiner—Donnie L. Crosland
Attorney, Agent, or Firm—John Russell Uren

[57] ABSTRACT

A brake light, particularly for a vehicle other than an automobile, that operates using minimal energy from the vehicle. A first embodiment teaches a brake light using inertial change to initiate its operation. A second embodiment uses a magnetic sensor to determine the speed of a rotating wheel and initiates operation of the brake light when the speed of the rotating wheel decreases by a predetermined amount.

5 Claims, 20 Drawing Sheets

```
                                ;Author: Stephen Wu
                                ;Date:   July 16,1989
                                ;Title:  Intel 8048 Controller Program for the Fiton Bicycle Safety Lamp
                                ;
                                ;Constants
000001 0000
000002 0000
000003 0000
000004 0000
000005 0000
000006 0000
000007 0033     HIMAXCNT:  .cequ    13210/256       ;count corresponding to 6km/hr
000008 009A     LOMAXCNT:  .cequ    13210%256       ;the minimum speed
000009 00FF     ALLONES:   .cequ    h'ff            ;used to complement the accumulator
000010 0006     HIINTVL0:  .cequ    1585/256
000011 0031     LOINTVL0:  .cequ    1585%256
000012 0008     HIINTVL1:  .cequ    2142/256
000013 005E     LOINTVL1:  .cequ    2142%256
000014 0000     HISUB1:    .cequ    18/256
000015 0012     LOSUB1:    .cequ    18%256
000016 000B     HIINTVL2:  .cequ    2936/256
000017 0078     LOINTVL2:  .cequ    2936%256
000018 0000     HISUB2:    .cequ    52/256
000019 0034     LOSUB2:    .cequ    52%256
000020 000F     HIINTVL3:  .cequ    3963/256
000021 007B     LOINTVL3:  .cequ    3963%256
000022 0000     HISUB3:    .cequ    145/256
000023 0091     LOSUB3:    .cequ    145%256
000024 0016     HIINTVL4:  .cequ    5661/256
000025 001D     LOINTVL4:  .cequ    5661%256
000026 0001     HISUB4:    .cequ    402/256
000027 0092     LOSUB4:    .cequ    402%256
000028 001C     HIINTVL5:  .cequ    7205/256
000029 0025     LOINTVL5:  .cequ    7205%256
000030 0004     HISUB5:    .cequ    1125/256
000031 0065     LOSUB5:    .cequ    1125%256
000032 0022     HIINTVL6:  .cequ    8806/256
000033 0066     LOINTVL6:  .cequ    8806%256
```

FIG. 8A

```
000034 000B     HISUB6:       .cequ    2987/256
000035 00AB     LOSUB6:       .cequ    2987%256
000036 0026     HIINTVL7:     .cequ    9907/256
000037 00B3     LOINTVL7:     .cequ    9907%256
000038 001D     HISUB7:       .cequ    7619/256
000039 00C3     LOSUB7:       .cequ    7619%256
000040 0029     HIINTVL8:     .cequ    10724/256
000041 00E4     LOINTVL8:     .cequ    10724%256
000042 0073     HISUB8:       .cequ    29686/256
000043 00F6     LOSUB8:       .cequ    29686%256
000044 0000
000045 0000     ;Register usage
000046 0000     ;           R0 = loop counter
000047 0000     ;           R1 = temporary save location of accumulator
000048 0000     ;           R2 = T2CALC    (high order byte)
000049 0000     ;           R3 = T2CALC    (low order byte)
000050 0000     ;           R4 = TIMER     (high order byte)
000051 0000     ;           R5 = TIMER     (low order byte)
000052 0000     ;           R6 = PARAMETER (high order byte)
000053 0000     ;           R7 = PARAMETER (low order byte)
000054 0000
000055 0000     ;Port usage
000056 0000     ;           P1 = lamp switch
000057 0000     ;           P2 = bike trigger latch clear
000059 0000
000060 0000            .org    h'0000              ;reset interrupt vector
000061 0000 0409       jmp     start
000062 0002
000063 0003            .org    h'0003              ;external interrupt vector
000064 0003 0409       jmp     start               ;restart
000065 0005
000066 0007            .org    h'0007              ;timer interrupt vector
```

FIG. 8B

```
000067 0007 2454              jmp    tmrint 000068 0009

000070 0009         start:
000071 0009 3432           call  turnon        ;turn on lamp
000072 000B 25             en    tcnti         ;enable timer overflow interrupt
000073 000C         begin:
000074 000C BA33           mov   r2,#HIMAXCNT  ;initialize T2CALC to MAXCNT
000075 000E BB9A           mov   r3,#LOMAXCNT
000076 0010
000077 0010 3439           call  clrlatch      ;reset positive edge trigger
000078 0012 3432           call  turnon        ;turn on lamp
000079 0014
000080 0014 3618    loop1: jt0   strtcnt       ;wait for trigger
000081 0016 0414           jmp   loop1
000082 0018
000083 0018 341D    strtcnt: call strtmr       ;triggered - start timer
000084 001A 3439           call  clrlatch      ;reset positive edge trigger
000085 001C
000086 001C 363C    loop2: jt0   stopcnt       ;wait for trigger
000087 001E FA             mov   a,r2          ;  while count < T2CALC
000088 001F 961C           jnz   loop 2
000089 0021 42             mov   a,t
000090 0022 D3FF           xrl   a,#ALLONES
000091 0024 6B             add   a,r3
000092 0025 F61C           jc    loop2
000093 0027
000094 0027 3432           call  turnon        ;  else
000095 0029 363E    loop3: jt0   newcnt        ;  turn on lamp
000096 002B FC             mov   a,r4          ;  wait for trigger
000097 002C D3FF           xrl   a,#ALLONES    ;    while count < MAXCNT
000098 002E 0333           add   a,#HIMAXCNT
000099 0030 F629           jc    loop3
```

FIG. 8C

| | | | | |
|---|---|---|---|---|
| 000100 0032 | 42 | | mov | a,t | ; else (overflow) |
| 000101 0033 | D3FF | | xrl | a,#ALLONES | ; go to beginning |
| 000102 0035 | 039A | | add | a,#LOMAXCNT | ;if trigger with count < T2CALC |
| 000103 0037 | F629 | | jc | loop3 | ; turn lamp off |
| 000104 0039 | | | | | |
| 000105 0039 | 65 | | stop | tcnt | |
| 000106 003A | 040C | | jmp | begin | |
| 000107 003C | | | | | |
| 000108 003C | | stopcnt: | | | |
| 000109 003C | 3436 | | call | turnoff | |
| 000110 003E | | | | | |
| 000111 003E | 65 | newcnt: | stop | tcnt | ;stop timer |
| 000112 003F | | | | | |
| 000113 003F | 42 | | mov | a,rt | ;read low order timer value |
| 000114 0040 | AD | | mov | r5,a | |
| 000115 0041 | | | | | |
| 000116 0041 | BE06 | | mov | r6,#HIINTVL0 | ;if count less than first interval |
| 000117 0043 | BF31 | | mov | r7,#LOINTVL0 | |
| 000118 0045 | 343F | | call | compare | |
| 000119 0047 | B68F | | jf0 | do0 | |
| 000120 0049 | | | | | |
| 000121 0049 | BE08 | | mov | r6,#HIINTVL1 | ;if count in first interval |
| 000122 004B | BF5E | | mov | r7,#LOINTVL1 | |
| 000123 004D | 343F | | call | compare | |
| 000124 004F | B699 | | jf0 | do1 | |
| 000125 0051 | | | | | |
| 000126 0051 | BE0B | | mov | r6,#HIINTVL2 | ;if count in second interval |
| 000127 0053 | BF78 | | mov | r7,#LOINTVL2 | |
| 000128 0055 | 343F | | call | compare | |
| 000129 0057 | B6A5 | | jf0 | do2 | |
| 000130 0059 | | | | | |
| 000131 0059 | BE0F | | mov | r6,#HIINTVL3 | ;if count in third interval |
| 000132 005B | BF7B | | mov | r7,#LOINTVL3 | |

FIG. 8D

```
000133 005D 343F              call    compare
000134 005F B6B1              jf0     do3
000135 0061                                             ;if count in fourth interval
000136 0061 BE16              mov     r6,#HIINTVL4
000137 0063 BF1D              mov     r7,#LOINTVL4
000138 0065 343F              call    compare
000139 0067 B6BD              jf0     do4
000140 0069                                             ;if count in fifth interval
000141 0069 BE1C              mov     r6,#HIINTVL5
000142 006B BF25              mov     r7,#LOINTVL5
000143 006D 343F              call    compare
000144 006F B6C9              jf0     do5
000145 0071                                             ;if count in sixth interval
000146 0071 BE22              mov     r6,#HIINTVL6
000147 0073 BF66              mov     r7,#LOINTVL6
000148 0075 343F              call    compare
000149 0077 B6D5              jf0     do6
000150 0079                                             ;if count in seventh interval
000151 0079 BE26              mov     r6,#HIINTVL7
000152 007B BFB3              mov     r7,#LOINTVL7
000153 007D 343F              call    compare
000154 007F B6E1              jf0     do7
000155 0081                                             ;if count in eighth interval
000156 0081 BE29              mov     r6,#HIINTVL8
000157 0083 BFE4              mov     r7,#LOINTVL8
000158 0085 343F              call    compare
000159 0087 B6ED              jf0     do8
000160 0089                                             ;else reload maximum count
000161 0089 BA33              mov     r2,#HIMAXCNT
000162 008B BB9A              mov     r3,#LOMAXCNT
000163 008d 0418              jmp     strtcnt
000164 008F
000165 008F              ;Calculate the next T2CALC
```

FIG. 8E

```
000166  008F                  do0:
000167  008F  FD                    mov    a,r5
000168  0090  0306                  add    a,#6
000169  0092  AB                    mov    r3,a
000170  0093  FC                    mov    a,r4
000171  0094  1300                  addc   a,#10
000172  0096  AA                    mov    r2,a
000173  0097  0418                  jmp    strcnt        ;r2,r3 = r4,r5 + 6
000174  0099
000175  0099  B806            do1:  mov    r0,#6
000176  009B  3400                  call   rrotadd       ;bit positions to shift
000177  009D  BE00                  mov    r6,#HISUB1    ;right rotate and add
000178  009F  BF12                  mov    r7,#LOSUB1
000179  00A1  3423                  call   subtract
000180  00A3  0418                  jmp    strcnt        ;subtract the constant
000181  00A5
000182  00A5  B805            do2:  mov    r0,#5
000183  00A7  3400                  call   rrotadd       ;bit positions to shift
000184  00A9  BE00                  mov    r6,#HISUB2    ;right rotate and add
000185  00AB  BF34                  mov    r7,#LOSUB2
000186  00AD  3423                  call   subtract
000187  00AF  0418                  jmp    strcnt        ;subtract the constant
000188  00B1
000189  00B1  B804            do3:  mov    r0,#4
000190  00B3  3400                  call   rrotadd       ;bit positions to shift
000191  00B5  BE00                  mov    r6,#HISUB3    ;right rotate and add
000192  00B7  BF91                  mov    r7,#LOSUB3
000193  00B9  3423                  call   subtract
000194  00BB  0418                  jmp    strcnt        ;subtract the constant
000195  00BD
000196  00BD  B803            do4:  mov    r0,#3
000197  00BF  3400                  call   rrotadd       ;bit positions to shift
000198  00C1  BE01                  mov    r6,#HISUB4    ;right rotate and add
```

FIG. 8F

```
000199 00C3 BF92              mov   r7,#LOSUB4        ;subtract the constant
000200 00C5 3423              call  subtract
000201 00C7 0418              jmp   strtcnt
000202 00C9
000203 00C9 B802       do5:   mov   r0,#2             ;bit positions to shift
000204 00CB 3400              call  rrotadd           ;right rotate and add
000205 00CD BE04              mov   r6,#HISUB5
000206 00CF BF65              mov   r7,#LOSUB5
000207 00D1 3423              call  subtract          ;subtract the constant
000208 00D3 0418              jmp   strtcnt
000209 00D5
000210 00D5 B801       do6:   mov   r0,#1             ;bit positions to shift
000211 00D7 3400              call  rrotadd           ;right rotate and add
000212 00D9 BE0B              mov   r6,#HISUB6
000213 00DB BFAB              mov   r7,#LOSUB6
000214 00DD 3423              call  subtract          ;subtract the constant
000215 00DF 0418              jmp   strtcnt
000216 00E1
000217 00E1 B801       do7:   mov   r0,#1             ;bit positions to shift
000218 00E3 3413              call  lrotate           ;left rotate
000219 00E5 BE1D              mov   r6,#HISUB7
000220 00E7 BFC3              mov   r7,#LOSUB7
000221 00E9 3423              call  subtract          ;subtract the constant
000222 00EB 0418              jmp   strtcnt
000223 00ED
000224 00ED B802       do8:   mov   r0,#2             ;bit positions to shift
000225 00EF 3413              call  lrotate           ;left rotate
000226 00F1 BE73              mov   r6,#HISUB8
000227 00F3 BFF6              mov   r7,#LOSUB8
000228 00F5 3423              call  subtract          ;subtract the constant
000229 00F7 0418              jmp   strtcnt
000230 00F9
```

FIG. 8G

```
                        ;Subroutines
000232 00F9             .page
000233 00F9             ;Rotate right and add
000234 00F9     rrotadd:
000235 0100             mov    a,r4           ;copy r4 and r5 into r6 and r7
000236 0100             mov    r6,a
000237 0100 FC          mov    a,r5
000238 0101 AE          mov    r7,a
000239 0102 FD
000240 0103 AF
000241 0104     rrot1:
000242 0104 97          clr    c              ;repeat
000243 0105 FE          mov    a,r6           ;  clear the carry flag
000244 0106 67          rrc    a              ;  shift zeroes in on left side
000245 0107 AE          mov    r6,a
000246 0108 FF          mov    a,r7
000247 0109 67          rrc    a
000248 010A AF          mov    r7,a
000249 010B E804        djnz   r0,rrot1       ;until loop counter =0
000250 010D 6D          add    a,r5           ;r4,r5 = r4,r5 + r6,r7
000251 010E AD          mov    r5,a
000252 010F FE          mov    a,r6
000253 0110 7C          addc   a,r4
000254 0111 AC          mov    r4,a
000255 0112 83          ret
000256 0113             ;Left rotate
000257 0113     lrotate:
000258 0113 97          clr    c              ;repeat
000259 0114 FD          mov    a,r5           ;  clear the carry flag
000260 0115 F7          rlc    a              ;  shift zeroes in on right side
000261 0116 AD          mov    r5,a
000262 0117 FC          mov    a,r4
000263 0118 F7          rlc    a
000264 0119 AC          mov    r4,a
```

FIG. 8H

```
000265  011A  E813              djnz    r0,1rotate      ;until loop counter = 0
000266  011C  83                ret
000267  011D
000268  011D        ;Start timer
000269  011D        strtmr:
000269  011D  27            clr     a
000270  011E  AC            mov     r4,a                ;reset timer
000271  011F  62            mov     t,a                 ; clear high order byte
000272  0120  25            en      tcnti               ; clear low order byte
000273  0121  55            strt    t
000274  0122  83            ret                         ;start timer
000275  0123
000276  0123        ;Subtract 16 bit numbers
000277  0123        subtract:
000277  0123  FD            mov     a,r5                ;r3 = r5 - r7
000278  0124  D3FF          xrl     a,#ALLONES
000279  0126  6F            add     a,r7
000280  0127  D3FF          xrl     a,#ALLONES
000281  0129  AB            mov     r3,a
000282  012A  FC            mov     a,r4                ;r2 = r4 - r6 - borrow
000283  012B  D3FF          xrl     a,#ALLONES
000284  012d  7e            addc    a,r6
000285  012E  D3FF          xrl     a,#ALLONES
000286  0130  aa            mov     r2,a
000287  0131  83            ret
000288  0132
000289  0132        ;Turn on lamp
000290  0132        turnon:
000290  0132  2301          mov     a,#1                ;output 1 to port 1
000291  0134  39            outl    p1,a
000292  0135  83            ret
000293  0136
000294  0136        ;Turn off lamp
000295  0136        turnoff:
000295  0136  27            clr     a                   ;output 0 to port 1
000296  0137  39            outl    p1,a
```

FIG. 8I

```
000297 0138 83              ret
000298 0139                  ;Clear positive edge trigger latch
000299 0139         clrlatch:
000300 0139 27              clr     a
000301 013A 3A              outl    p2,a
000302 013B 2301            mov     a,#1
000303 013D 3A              outl    p2,a                    ;output 0 to port 2
000304 013E 83              ret                             ;output 1 to port 2
000305 013F                  ;Compare two 16 bit values
000306 013F         compare:
000307 013F FC              mov     a,4r                    ;f0 = r4,r5 < r6,r7
000308 0140 D3FF            xrl     a,#ALLONES
000309 0142 6E              add     a,r6
000310 0143 F651            jc      setrtn                  ;jump if r4 < r6
000311 0145 D3FF            xrl     a,#ALLONES              ;therefore r4 >= r6
000312 0147 964F            jnz     clrrtn                  ;jump if r4 > r6
000313 0149 FD              mov     a,r5                    ;therefore r4 = r6
000314 014A D3FF            xrl     a,#ALLONES
000315 014C 6F              add     a,r7
000316 014D F651            jc      setrtn                  ;jump if r5 < r7
000317 014F         clrrtn:
000318 014F 85              clr     f0                      ;clear f0
000319 0150 83              ret
000320 0151         setrtn:
000321 0151 85              clr     f0
000322 0152 95              cpl     f0                      ;set f0
000323 0153 83              ret
000324 0154                  ;Timer interrupt service routine
000325 0154         tmrint:
000326 0154 A9              mov     r1,a                    ;save accumulator
000327 0155 1C              inc     r4                      ;increment high order timer byte
000328 0156 FA              mov     a,r2                    ;if r2 <> 0
       0157 C65A            jz      tmrrtn
```

FIG. 8J

```
000329 0159 CA          dec    r2       ; decrement high order byte of
T2CALC
000330 015A FC  tmrrtn:  mov    a,r4
000331 015B 02           outl   bus,a
000332 015C F9           mov    a,r1     ;restore accumulator
000333 015D 93           retr
000334 015E
000335 015E             .end
```

FIG. 8K

```
ALLONES  =00FF   TURNOFF =0136
BEGIN    =000C   TURNON  =0132
CLRLATCH=0139
CLRRTN   =014F
COMPARE  =013F
D00      =008F
D01      =0099
D02      =00A5
D03      =00B1
D04      =00BD
D05      =00C9
D06      =00D5
D07      =00E1
D08      =00ED
HIINTVL0=0006
HIINTVL1=0008
HIINTVL2=000B
HIINTVL3=000F
HIINTVL4=0016
HIINTVL5=001C
HIINTVL6=0022
HIINTVL7=0026
HIINTVL8=0029
HIMAXCNT=0033
HISUB1   =0000
HISUB2   =0000
HISUB3   =0000
HISUB4   =0001
HISUB5   =0004
HISUB6   =000B
HISUB7   =001D
HISUB8   =0073
```

FIG. 8L

```
LOINTVL0=0031
LOINTVL1=005E
LOINTVL2=0078
LOINTVL3=007B
LOINTVL4=001D
LOINTVL5=0025
LOINTVL6=0066
LOINTVL7=00B3
LOINTVL8=00E4
LOMAXCNT=009A
LOOP1    =0014
LOOP2    =001C
LOOP3    =0029
LOSUB1   =0012
LOSUB2   =0034
LOSUB3   =0091
LOSUB4   =0092
LOSUB5   =0065
LOSUB6   =00AB
LOSUB7   =00C3
LOSUB8   =00F6
LROTATE  =0113
NEWCNT   =003E
RROT1    =0104
RRPTADD  =0100
SETRTM   =0151
START    =0009
STOPCNT  =003C
STRTCNT  =0018
STRTMR   =011D
SUBTRACT=0123
TMRINT   =0154
TMRRET   =015A
```

FIG. 8M

BRAKE LIGHT

INTRODUCTION

This invention relates to a brake light for a vehicle and, more particularly, to a brake light for a vehicle which operates using a minimal amount of energy from the vehicle.

BACKGROUND OF THE INVENTION

The mandatory use of brake lights on a vehicle allows the operator of a following car to govern his speed accordingly. Brake lights are far more likely to be perceived as indicating a change in speed of the vehicle than does the decrease in vehicle speed.

There are, of course, brake lights used which light when the brakes of a vehicle are applied. These lights use the battery power of the vehicle and are generally initiated through a simple relay and switch arrangement that creates power flow to the brake light when the brake pedal is depressed. Such brake lights do not illuminate when the brake pedal is not depressed, despite the fact that the vehicular speed may be decreasing.

Certain lights are illuminated, in some instances, when the brake pedal is not depressed but the foot of the operator is removed from the accelerator. For example, a red-amber-green combination light which is normally positioned in the back window of the vehicle operates to illuminate the green when the operator's foot is on the accelerator, the amber when the operator's foot is off the accelerator and the red when the brake pedal is depressed. It is again illuminated with switch and relay means.

Certain disadvantages are inherent in such systems. For example, in tractor-trailer rigs, long cables from the brake lights to the batteries and the relays and switches are vulnerable to damage. On a bicycle, where the change in bicycle speed is even less perceptible than a car, brake lights are not normally used and, of course, they will not illuminate if the brakes are not applied. Since a bicycle may be stopped with both hand and foot brakes, it would be necessary to install a switch for each with the concomitant necessity for extra wiring, etc., which is unsightly and complicated on a bicycle. On wheelchairs, similar considerations apply but it is desirable to have an indication when the speed is decreasing and not, necessarily, just when the brakes are applied.

SUMMARY OF THE INVENTION

According to one aspect of the invention, there is provided a speed indicating light for a vehicle comprising a light, means for measuring the rotational speed of a rotating element on said vehicle, means for determining a first rotational speed of said rotating element, means for determining a subsequent rotational speed of said rotating element, and means for initiating illumination of said light when said subsequent rotational speed is less that said first rotational speed by a predetermined amount.

According to a further aspect of the invention, there is provided a brake light comprising a casing, a light within said casing, a switch having activated and non-activated positions, an inertia operated contact movable between said activated and non-activated positions of said switch and a power source for said light.

BRIEF DESCRIPTION OF THE SEVERAL VIEWS OF THE DRAWINGS

A specific embodiment of the invention will now be described, by way of example only, with the use of drawings in which:

FIG. 8A–8M are a listing of the source code.

DESCRIPTION OF SPECIFIC EMBODIMENT

Figure 1:
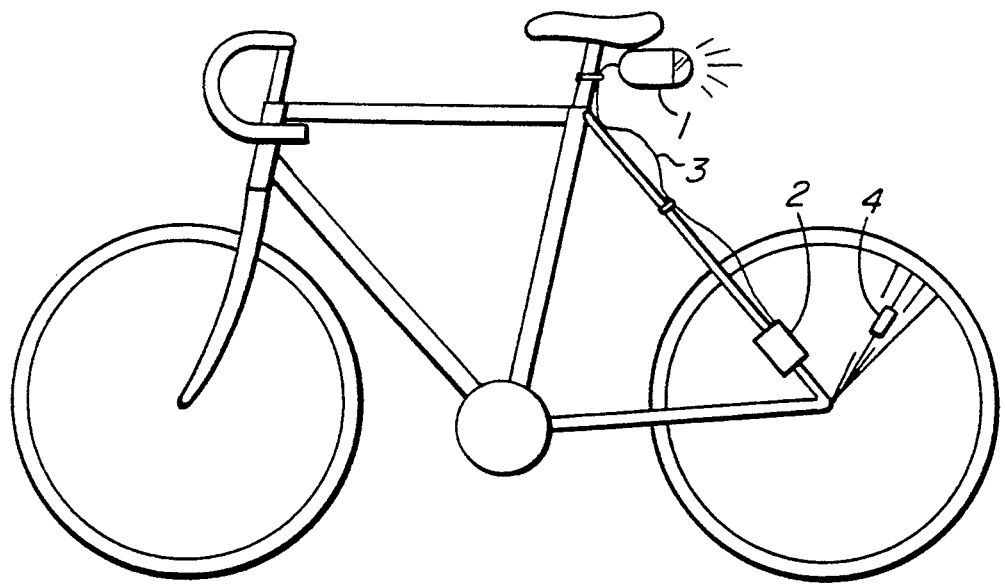
FIG. 1 is a diagrammatic side view of a bicycle with a brake light according to the invention.

Referring now to the drawings, an overview of the system according to the invention is illustrated in FIG. 1. It comprises a magnetic sensor illustrated generally at 2 which has a proximity sensor mounted to the bicycle frame and a moving piece of metal 4 mounted on a spoke of the wheel of a bicycle. A cable 3 is connected between the sensor 2 and a brake light 1.

Figure 2:
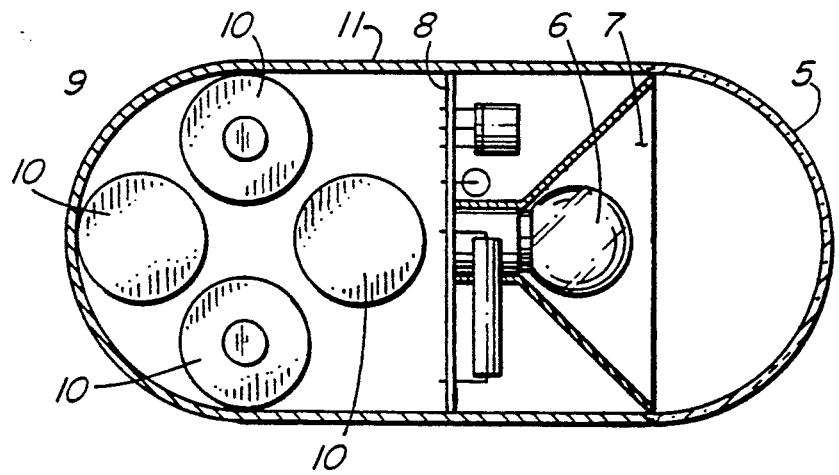
FIG. 2 is a diagrammatic enlarged sectional view of the brake light housing assembly of FIG. 1.

The lamp housing assembly 1 is illustrated in more detail in FIG. 2. The assembly 1 includes a red light cover 5, a light bulb 6, a parabolic reflector 7, a circuit board 8, a battery cover 9, a set of batteries 10 and the assembly casing 11.

Figure 3:
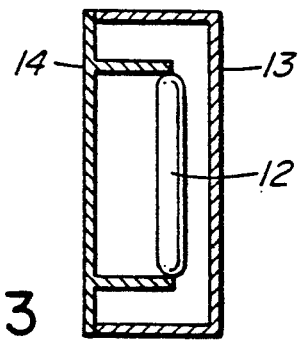
FIG. 3 is a diagrammatic enlarged sectional view of the sensor housing assembly used for the brake light of FIG. 1.

The sensor housing assembly 2 is illustrated in more detail in FIG. 3. The assembly 2 includes a magnetic reed switch sensor 12, a sensor housing 13 and a sensor cover 14.

Figure 4:
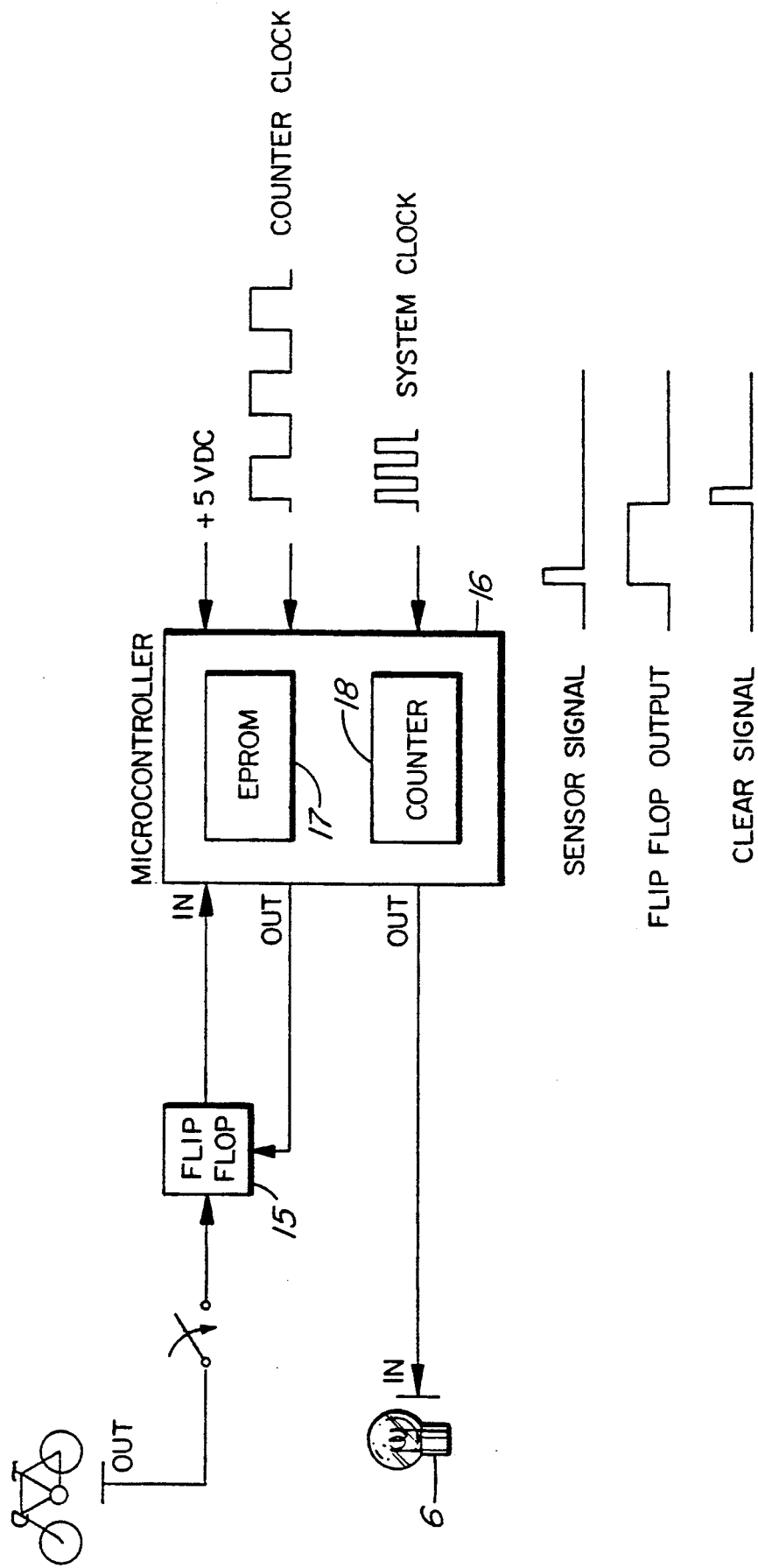
FIG. 4 is a block diagram of the sensor and lamp system according to the invention.

The block diagram of the lamp housing assembly of FIG. 2 is illustrated in FIG. 4. It includes a flip flop 15, a micro controller 16 with an on board EPROM 17 and an on board counter 18 and the light bulb 6.

Figure 5:
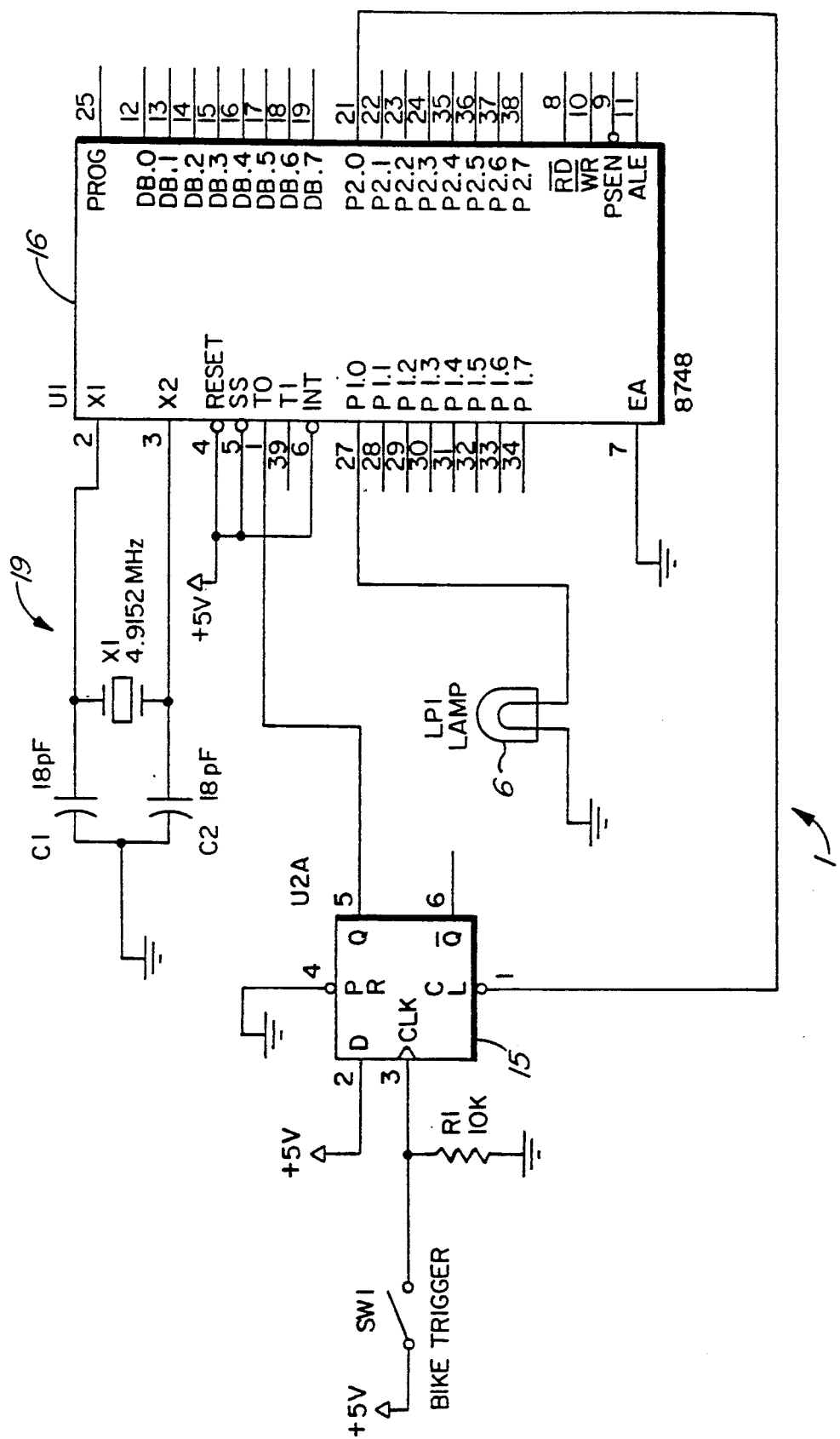
FIG. 5 is a schematic diagram of the sensor and lamp system according to the invention.

FIG. 5 illustrates the schematic diagram of the lamp housing assembly 1 and again comprises a flip flop 15, a micro controller 16, a micro controller clock oscillator circuit 19, and a light bulb 6;.

Figure 6:
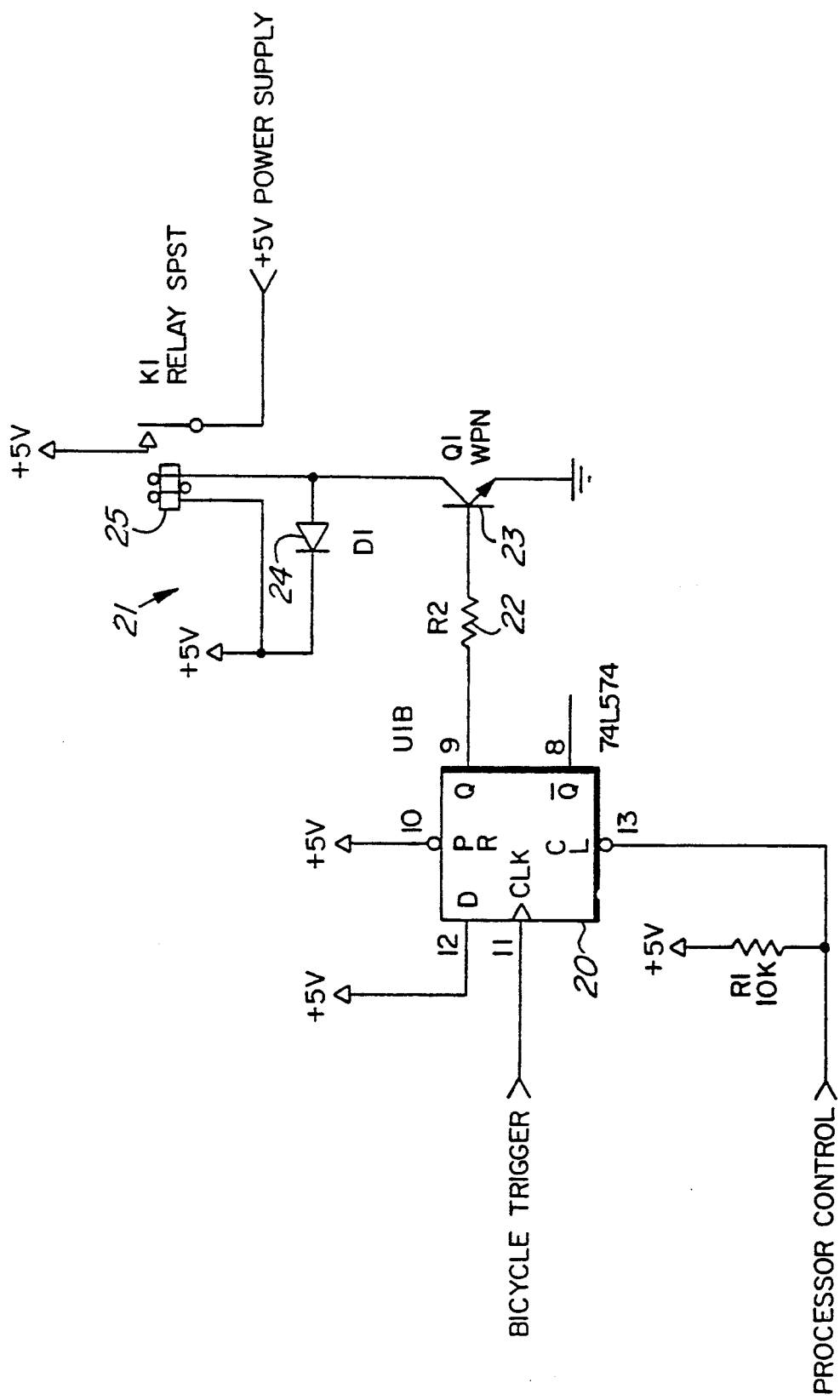
FIG. 6 is a schematic diagram of the automatic power off circuit.

FIG. 6 is a schematic diagram of a supplementary automatic power-off circuit and illustrates a flip flop 20 and a relay assembly 21;

OPERATION

Figure 7:
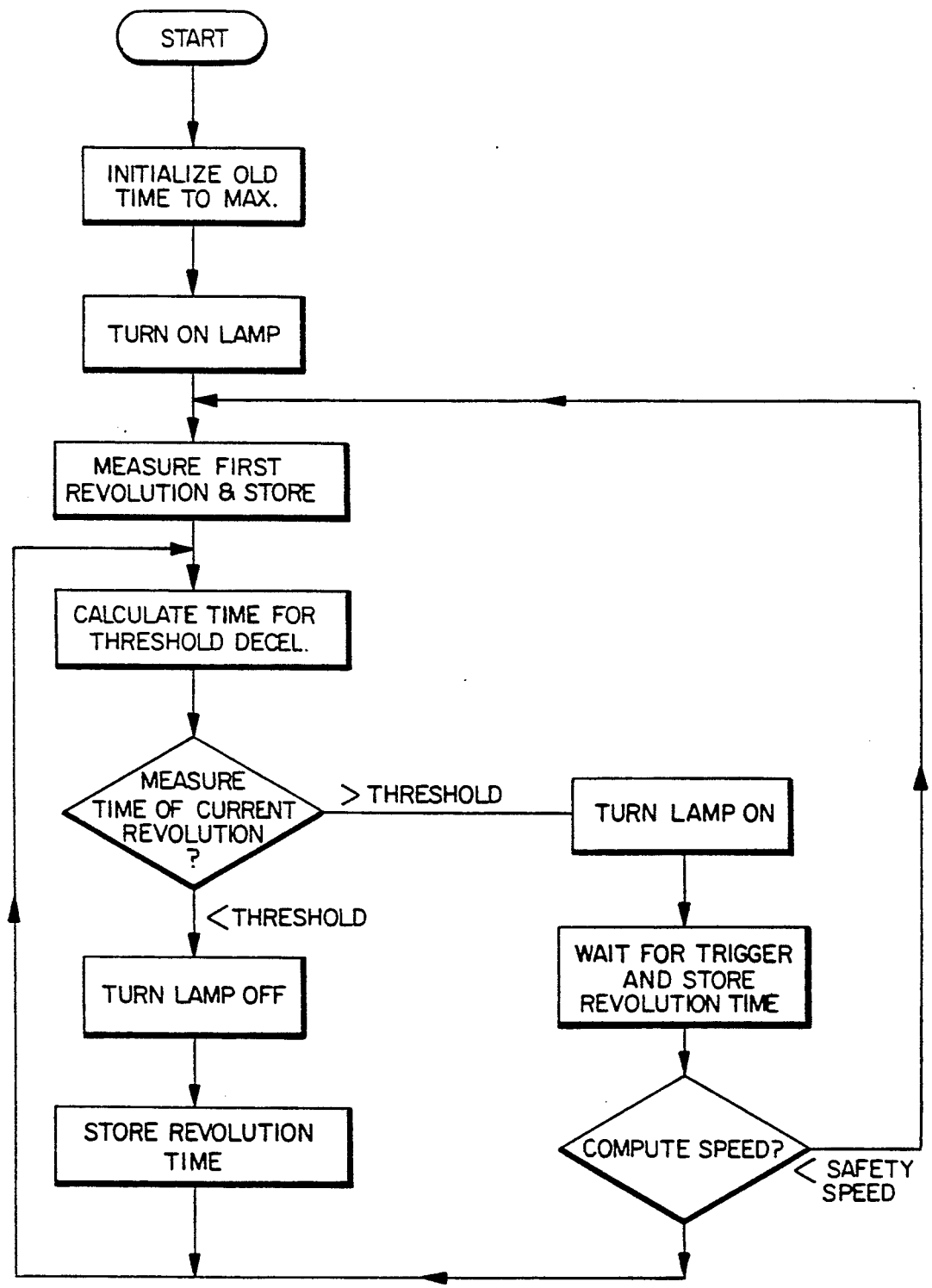
FIG. 7 is a flow chart for the firmware.

At startup and with reference to FIG. 7, a reference rear wheel revolution time is set to a maximum value to reflect a low rotational and, hence, vehicle speed. The brake light 6 is illuminated as a self-test and also to reflect the lower speed.

The unit next attempts to measure the actual rear wheel revolution time. However, for this value to be within the unit's measurable range, the vehicle must first reach a minimum speed. Once a first valid value is measured, it is stored as a new reference time.

As an indirect method of sensing a threshold level of deceleration indicative of braking, the unit calculates a corresponding threshold rear wheel revolution time based upon the current reference time. Upon measuring the next rear wheel revolution time, the unit decides whether this time is longer or shorter than the calculated threshold value.

If the new measured value is shorter than the calculated threshold value, the brake light is turned off and the new revolution time becomes the new reference for further calculation.

If the new measured value is longer than the calculated threshold value, the brake light is illuminated and the new revolution time becomes the new reference for further calculation. If the vehicle speed has decreased to the point where the revolution time is beyond the measurable range, then the unit reverts to start-up, attempting to establish a valid first reference value.

With reference to FIG. 6 and once the rear wheel stops revolving completely, the power to the unit automatically shuts off, after a certain delay time, under the direction of the micro-controller.

Figure 9:
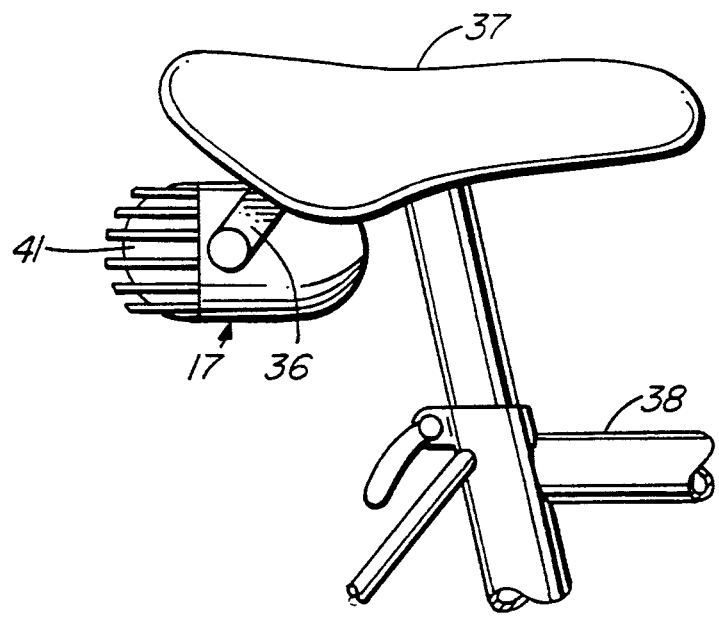
FIG. 9 is a side view of a further embodiment of a brake light according to the invention in position on a bicycle seat.

In a further embodiment of the invention, an inertia operated brake light is illustrated generally at 17 in FIG. 9. It is illustrated as being connected by a bracket 36 to the rearward end of a bicycle seat 37 attached to a bicycle 38. A red lens 41 is mounted on the back portion of the brake light 17 and is illuminated as described in detail hereinafter.

Figure 10:
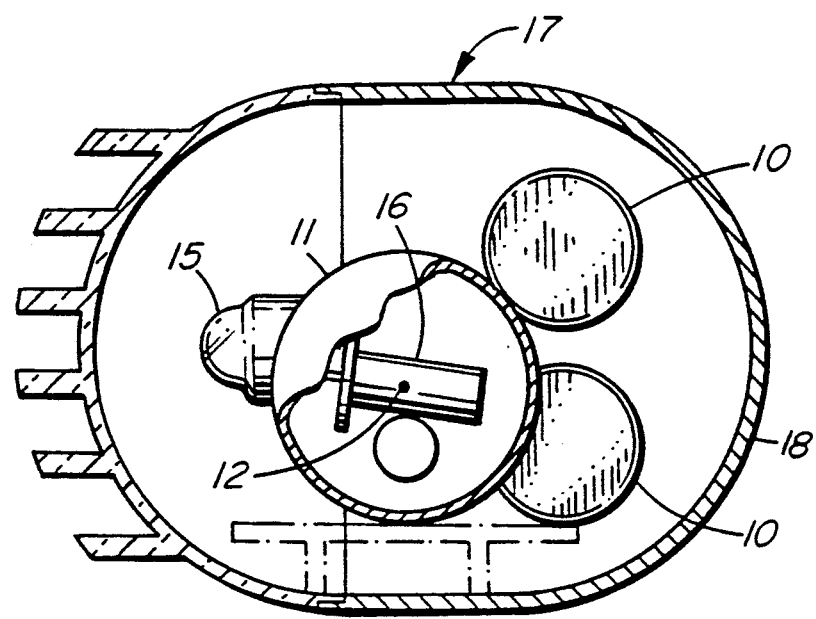
FIG. 10 is a diagrammatic side view of the brake light at FIG. 9.
Figure 11:
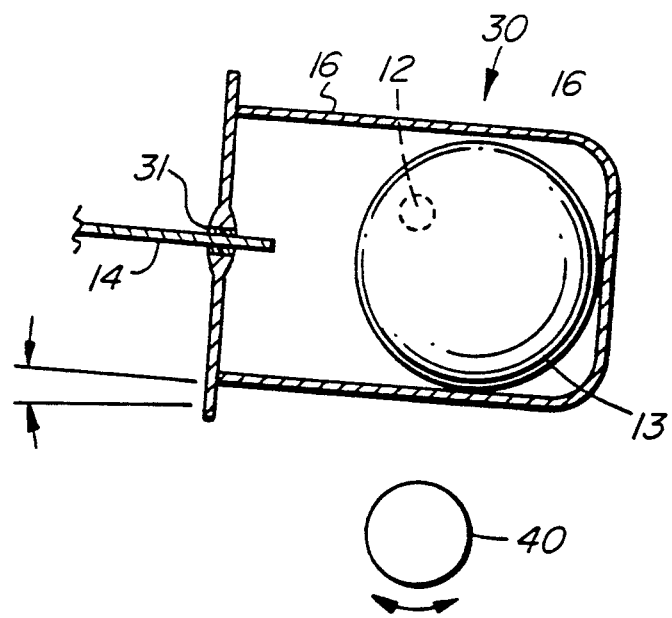
FIG. 11 is a diagrammatic sectional view of the contact apparatus in the form of an inertia switch in the brake light of FIG. 9.

Referring to FIGS. 10 and 11, the brake light 17 includes a casing 18 which contains a power source in the form of a pair of batteries 10. A switch enclosure 11 is contained within the casing 18. A gimballed inertia switch generally illustrated at 30 is attached to and pivots in a substantially vertical plane about an axis 12 so that its' attitude relative to enclosure 11 is dependent on the operating position of the bicycle 38 on which the brake light 17 is fixed. A counterweight 40 assists to move the switch 30 under the different positions of the bicycle 38 such that its position remains substantially as illustrated in the drawings.

Within the gimballed switch enclosure 11 and with reference to FIG. 11, the inertia switch includes a conductive gold plated ball 13 which is mounted within a substantially cylindrical sealed conductive drawn nickel tube 16, the tube 16 being inclined in its normal position as illustrated under the influence of a counterweight 40 which is connected to the switch 30. The tube 16 together with the counterweight 40 rotate about axis 12.

When the brake light 17 is not activated, the gold plated ball 13 makes contact with both the walls and the lower end of the conductive drawn nickel tube 16. A conductive gold plated electrical contact 14 is insulated from the substantially cylindrical tube 16 by way of rubber washer 31 and is situated at the opposite end of the tube 16 from the gravity actuated position of the conductive gold plated ball switch 13.

The brake light 17 will be attached by way of a bracket 36 to the rear of a bicycle seat 37 on bicycle 38 so that it becomes substantially integral with the bicycle seat 37. Under normal forward travel conditions, the switch 30 will pivot about the substantially horizontal axis 12 under the influence of counterweight 40 and be maintained in an attitude to keep the conductive gold plated ball 13 in position against the lower oriented end of the conductive drawn nickel tube 16 as viewed in FIG. 11.

Under conditions of deceleration, however, inertia will cause the ball 13 to move toward and contact the conductive gold plated electrical contact 14 which will complete the circuit between the conductive tube 16 and contact 14 thereby illuminating the light bulb 15. When deceleration ceases, the conductive gold plated ball 13 will return to its position as illustrated in FIG. 11 and the light source 25 will be turned off due to the circuit being opened.

Figure 12:
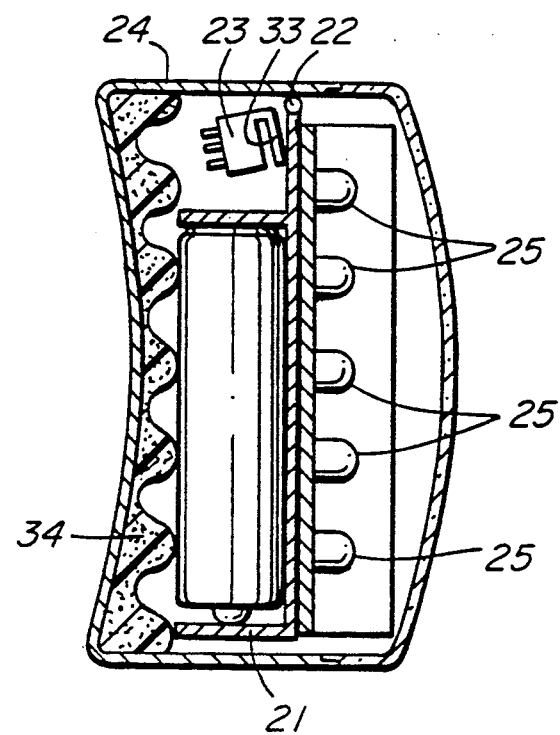
FIG. 12 is a vertical sectional view of yet a further embodiment of a brake light.

A second embodiment of the invention is illustrated in FIG. 12. A battery holder 21 is mechanically attached in a substantially horizontal orientation to the casing 24 by an arm at pivot point 22. A switch 23 is fixed mechanically to the battery case 21 at a point between the pivot point 22 and the battery case 21 and a cantilevered arm 33 extends from the switch 23. The switch 23 is connected through an electrical circuit (not shown) to both the light source 25 and the battery case 21. A foam damper 34 is inserted between the casing 24 and the batter holder 21 to bias the battery holder 21 towards the position as illustrated.

In operation and when the bicycle 38 decelerates, inertia causes the battery holder 21 to pivot about axis 22 in the direction of travel of the vehicle forcing the cantilever arm 33 of the switch 23 toward the stationary portion of the switch 23 which is connected to casing 24. When the arm 33 makes contact with the body of the switch 23, the circuit is closed and the bulbs 25 are illuminated. When deceleration ceases, the absence of inertia and the bias due to form damper 34 causes battery holder 21 to return to its normal inactivated position which thereby allows the cantilever arm 33 of the switch 23 to move away from its contact position and the circuit between the light source 25 and the battery case 21 is opened to shut off the light bulb 25.

While the brake light has been described as being used on a bicycle, many other appropriate uses on other vehicles or conveyances would, of course, be possible, such as boats, planes and the like and, indeed, could be used to initiate the operation of a light from any source using rotation. Similarly, while the light source is stated to be a bulb, it is clear that other illumination devices such as a light emitting diodes (L.E.D.'s) could also be used so long as necessary visible illumination is provided. Likewise, while the power source is said to be batteries, it is clear that other sources such as solar cells and the like could also be used.

Many modifications will readily occur to those skilled in the art to which the invention relates and the specific modifications set forth herein should be construed as illustrative only and not as limiting their scope as defined in accordance with the accompanying claims.

What is claimed is:

1. Speed indicating light apparatus which indicates acceleration and deceleration of a vehicle such as a bicycle having wheels relatively large when compared to the size of said vehicle, said apparatus comprising a light mounted on the rearward area of said vehicle, a magnetic sensor mounted on one of said wheel or vehicle, a metallic material mounted on the other of said wheel or vehicle such that said metallic material and said magnetic sensor come into proximity and create a signal when said wheel rotates, means for determining a first rotational speed of said wheel from said signal, means for determining a subsequent rotational speed of said wheel from said signal, and means for initiating illumination of said light when said subsequent rotational speed of said wheel is less than said first rotational speed of said wheel by a predetermined amount.

2. Speed indicating light apparatus as in claim 1 wherein said first rotational speed determining means is a micro controller.

3. Speed indicating light apparatus as in claim 2 wherein said micro controller includes an EPROM and a counter.

4. Speed indicating light apparatus as in claim 2 wherein said magnetic sensor comprises a proximity switch mounted on the frame of said vehicle and said metallic material is mounted on the wheel of said vehicle.

5. Speed indicating light apparatus as in claim 4 wherein said proximity switch is a magnetic reed switch.

* * * * *